United States Patent [19]
Sakamoto et al.

[11] Patent Number: 5,574,498
[45] Date of Patent: Nov. 12, 1996

[54] TARGET TRACKING SYSTEM

[75] Inventors: Takayuki Sakamoto; Koji Kageyama, both of Kanagawa, Japan

[73] Assignee: Sony Corporation, Tokyo, Japan

[21] Appl. No.: 309,983

[22] Filed: Sep. 20, 1994

[30] Foreign Application Priority Data

Sep. 25, 1993 [JP] Japan .................................. 5-261678

[51] Int. Cl.⁶ .................................................. H04N 5/225
[52] U.S. Cl. ........................................... 348/169; 348/172
[58] Field of Search ..................................... 348/169, 170, 348/171, 172, 29, 30; 382/162, 106, 103

[56] References Cited

U.S. PATENT DOCUMENTS 4,847,688  7/1989  Nishimura et al. ..................... 348/172
5,062,056  10/1991  Lo et al. ................................. 348/171
5,406,501  4/1995  Florent .................................... 348/172

*Primary Examiner*—Tommy P. Chin
*Assistant Examiner*—A. Au
*Attorney, Agent, or Firm*—William S. Frommer; Alvin Sinderbrand

[57] ABSTRACT

In a target tracking system being capable of tracking a target object certainly, color change by illumination is absorbed through color judgment from R-Y and B-Y with forecast coefficients, not hue, and is forcibly switched the forecast coefficient of the luminance signal, so that a black and white target can be tracked certainly. Further, the evaluation is performed without the effect from small object in the image, and the center of gravity of the alteration amount is evaluated, so that the position can be detected even when the television camera is moving, and improving the tracking efficiency of target object.

6 Claims, 9 Drawing Sheets

$$E_{33} = |Y_{33} - Y| = |Y_{33} - (a0 \times S_{33} + b0)|$$
$$H_{start} < H_{33} < H_{stop}$$

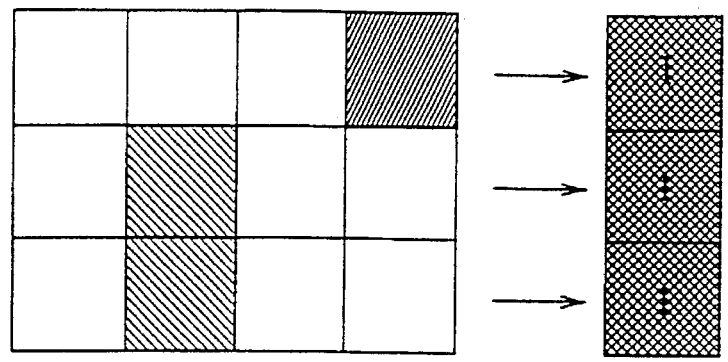
FIG. 6A
REGION OBTAINED FROM THE RESULT IN THE X DIRECTION
REGION OBTAINED FROM THE RESULT IN THE Y DIRECTION
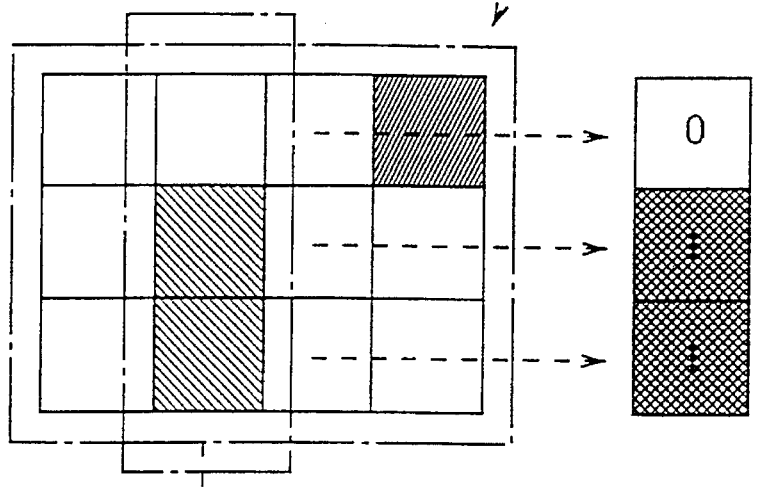
FIG. 6B

TARGET TRACKING SYSTEM

BACKGROUND OF THE INVENTION

1. Field of the Invention

This invention relates to a target tracking system and more particularly, to an improvement of target tracking system for tracking a target with a television camera moved based on the movement of the target.

2. Description of the Related Art

Heretofore, there has been provided a target tracking system that tracks a target with a television camera moved based on the movement of the target. In this case, the system detects the movement of the target in an image imaged by the television camera. Block matching is commonly used to detect movement. In block matching, the image around the target or a partial image characterizing the target is set as an original block, and the subsequent image is divided into blocks to detect the block having the minimum sum of absolute differences between pixels of the original block and pixels of the tested block, and the location of the target is determined.

However, in a target tracking system using block matching, a problem arises in that, because the location of a target is determined based on shape information included in the original block, tracking becomes difficult if the target itself changes shape or size. An additional problem arises in that, because calculating the minimum sum of absolute differences between pixels in the original block and those in the block in an image requires a large amount of calculation, the circuit structure becomes complicated, and calculation using a microcomputer becomes difficult.

To solve these problems, a method can be considered that sets a fixed color in color image signals as a characteristic quantity and that tracks each region that has horizontally and vertically integrated values of a color image corresponding to the color in a time continuum with previous regions, namely, regions adjacent to previous regions as a target. However, in this case, a problem arises in that it is difficult to determine delicate differences and changes in hue due to setting of a characteristic color and to determine location due to broken continuity in time-space images if a region is distant, namely, the target is small, or the target moves at comparatively high speed. An additional problem arises in that it is necessary to store a number of screens of the time-space image, which increases memory required for image storage.

A method can be considered that tracks a target, evaluating horizontal and vertical directions of a color image, and another method can track the target, evaluating horizontal and vertical directions from the error between actual data and that calculated from previous and current forecast coefficients, in the case of a set color, after the method sets the color and sets the forecast coefficient calculated from tint and saturation of the set color as a characteristic quantity.

However, since all of these methods set hue (the angle formed by R-Y and B-Y) as the characteristic quantity, it is difficult to track a target in the case of hue changes due to small changes in R-Y or B-Y and, as these methods get information mainly from hue, it is difficult to track a target which changes its hue based on the luminance of black and white illumination. In addition, an additional problem arises in that, since almost no television camera outputs saturation or hue signals, transformation must be made from color difference signals, complicating the structure.

Also, there has been provided a target tracking system that automatically tracks a target by utilizing the difference between fields of image (Japanese Patent Publication No.056111/1975). In the target tracking system, the inter-fields difference is evaluated per pixel, and a pan and tilt motor is controlled in accordance with the position of pixel that fluctuation is detected and the difference of the distance from the center.

However, in the target tracking system described above, there are some problems that the system works improperly due to level fluctuation caused by image signal noise because the inter-fields difference is evaluated per pixel, the moving object may exist in the screen other than the target area, and random fluctuation in the image may occur while the television camera is improperly operated.

Also, there has been provided a target object tracking system that displays a frame indicating the moving object to be tracked in an image, and tracks the frame by a video camera in accordance with the detected result of the motion vectors of a plurality of blocks in the frame (European Patent Publication No.0557007).

SUMMARY OF THE INVENTION

In view of the foregoing, a first object of this invention is to provide a target tracking system for tracking a target with certainty in the case of color change caused by illumination and a black and white target.

A second object of this invention is to provide a target tracking system in which the noise, the movement of another objects in the image, and the improper control of the motor are prevented to track a target object certainly.

The foregoing first object and other objects of the invention have been achieved by the provision of a target tracking system comprising: a luminance forecast coefficient setting means 14 (SP26) for calculating a coefficient to forecast a luminance signal from an R-Y signal and a B-Y signal in a region of interest in an input color image signal TV1; an origin change means 14 (SP31) for changing the origin of R-Y and B-Y signals virtually through a color judgment from R-Y and B-Y signals; a B-Y forecast coefficient setting means 14 (SP31) for calculating a coefficient to forecast the B-Y signal from the R-Y signal in the region of interest in the color image signal TV1; a memory means 14 (SP31) for storing R-Y, B-Y, and luminance signals to represent the region of interest in the color image signal TV1; a B-Y signal difference calculation means 14 (SP31) for calculating the difference between the actual B-Y signal and value forecast from the R-Y signal with coefficients to pixels in the image; a luminance signal difference calculation means 14 (SP31) for calculating the difference between the actual luminance signal and value forecast from R-Y and B-Y signals with coefficients to pixels in the image; a difference calculation means 14 (SP31) for calculating the difference among R-Y, B-Y, and luminance set signals with coefficients to pixels in the image; a one-dimensional evaluation function calculation means 14 (SP31) for calculating a one-dimensional evaluation function from the absolute sum of differences in the image; a binary conversion means 14 (SP31) for converting the image to a binary image by adaptively changing the threshold value; a location determination means 14 (SP31) for determining a location from the binary image; a target object detection means for continuously detecting the location of a target object in the image by repeating the luminance forecast coefficient setting means 14 (SP26), the origin change means 14 (SP31), the B-Y forecast coefficient setting means 14 (SP31), the memory means 14 (SP31), the B-Y signal difference calculation means 14 (SP31), the luminance signal difference calculation means 14 (SP31), the difference calculation means 14 (SP31), the one-dimensional evaluation function calculation means 14 (SP31), the binary conversion means 14 (SP31), and the location determination means 14 (SP31); and a camera control means 14 (SP32) for controlling the panning and tilt of the television camera based on the location of the detected target object.

The foregoing second object and other objects of the invention have been achieved by the provision of a target tracking system comprising: decimating means 51 for digitalizing image signal TV1 inputted from a television camera 50 and performing decimating the digitalized image signal which has been bandwidth limited at a low-pass filter; image memory means 52 for storing the decimated image and delaying for a predetermined time or memorizing the decimated image; alteration amount extracting means 54 for extracting the alteration amount in each picture element between the decimated image delayed for a predetermined time or memorized and the decimated image outputted from the decimating means 51; center of gravity calculating means 54 for calculating the center of gravity in the horizontal and vertical direction by integrating the extracted alteration amount in each picture element; camera control means for controlling the imaging position of television camera 50 in order that the target object moving in the screen is positioned at the center of the screen based on the center of gravity in the horizontal and vertical direction.

Further, in this invention, image memory means 72 for storing color signal H in addition to the decimated image L decimated at decimating means 71, and delaying for a predetermined time or memorizing the decimated image L and the color signal H; characteristic color setting means 74 for specifying the arbitrary color signal in the image and setting characteristic color of the target object; and center of gravity calculating means 74 for weighting in accordance with the characteristic color set at the characteristic color setting means 74 when the alteration amount of pixel extracted at the alteration amount extracting means 74 is integrated in the horizontal and vertical direction, to calculate the center of gravity in the horizontal and vertical direction.

The invention does not use hue for its determination, and comprises an error evaluation means 14 (SP31) by forecasting B-Y from R-Y, an origin change means 14 (SP31) to R-Y and B-Y, and a forecast coefficient change means 14 (SP31) in the case of determining a target object as black and white, whereby the invention provides a target tracking system that can also track the black and white target with certainty because the invention can process color change by illumination by color judgment from R-Y and B-Y with coefficients, not hue, and forcibly switch the coefficient of the luminance signal.

Also, the image signal TV1, TV2 inputted at the decimating means 51, 71 are decimated by filter processing, so as to remove the noise component in the image to obtain the alteration amount which is difficult to be affected by noise, and moreover, the alteration amount for characteristic color specified at the center of gravity calculating means 54, 74 is weighted, so that the alteration amount of target object can be attached greater importance. Furthermore, the alteration amount is integrated in the horizontal and vertical direction to evaluate, so as to evaluate without the effect from little object in the image, and by evaluating the center of gravity of the alteration amount, the position can be detected even when the television camera 50, 70 are moving, so as to enable to improve the tracking efficiency of target object.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 6A and 6B are schematic diagrams explaining how contradictions in one-dimensional data are solved;

DETAILED DESCRIPTION OF THE EMBODIMENT

Preferred embodiments of this invention will be described with reference to the accompanying drawings:

(1) First Embodiment

Figure 1:
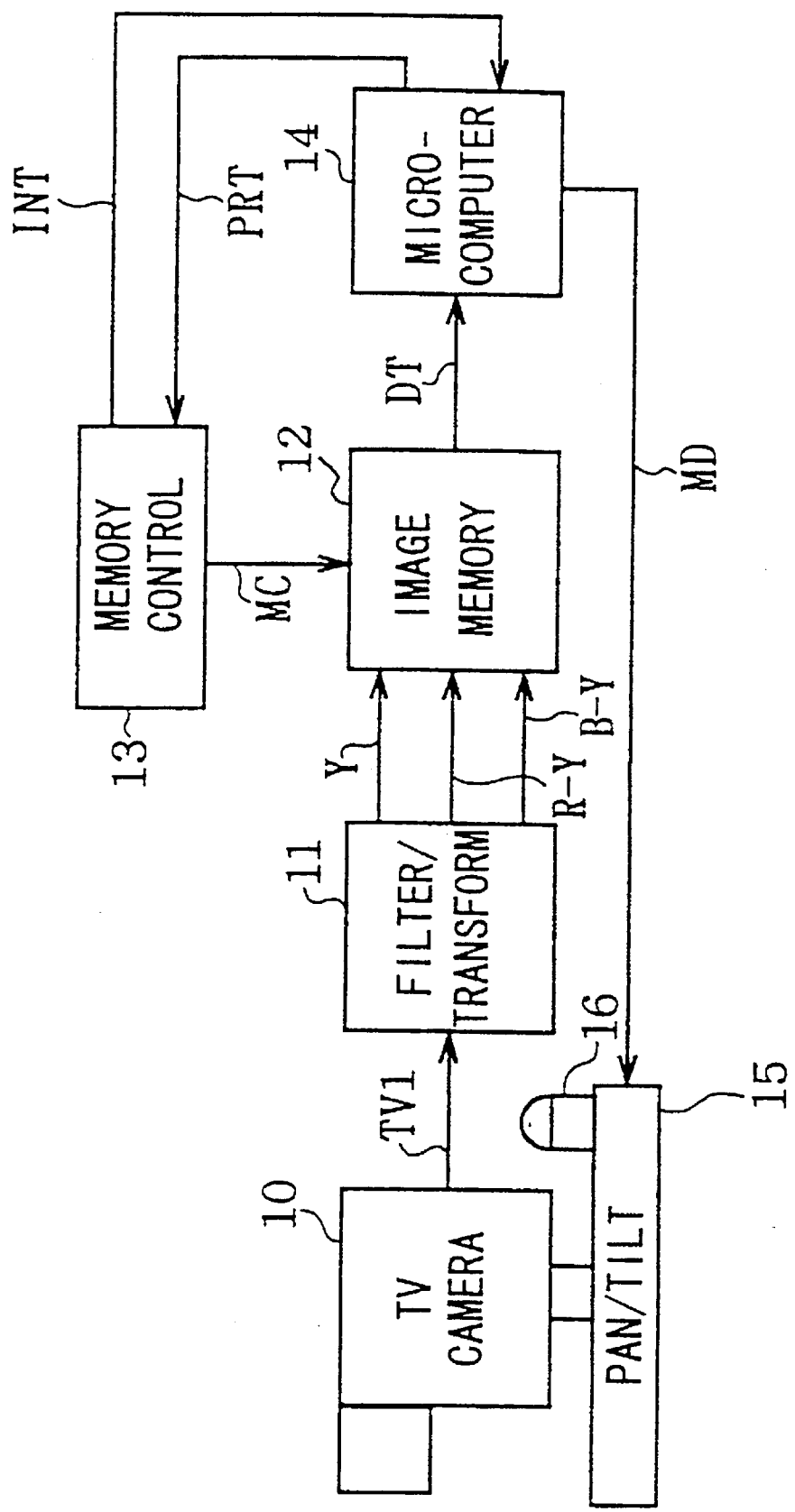
FIG. 1 is a block diagram showing a first embodiment of a target tracking system according to this invention.
Figure 2:
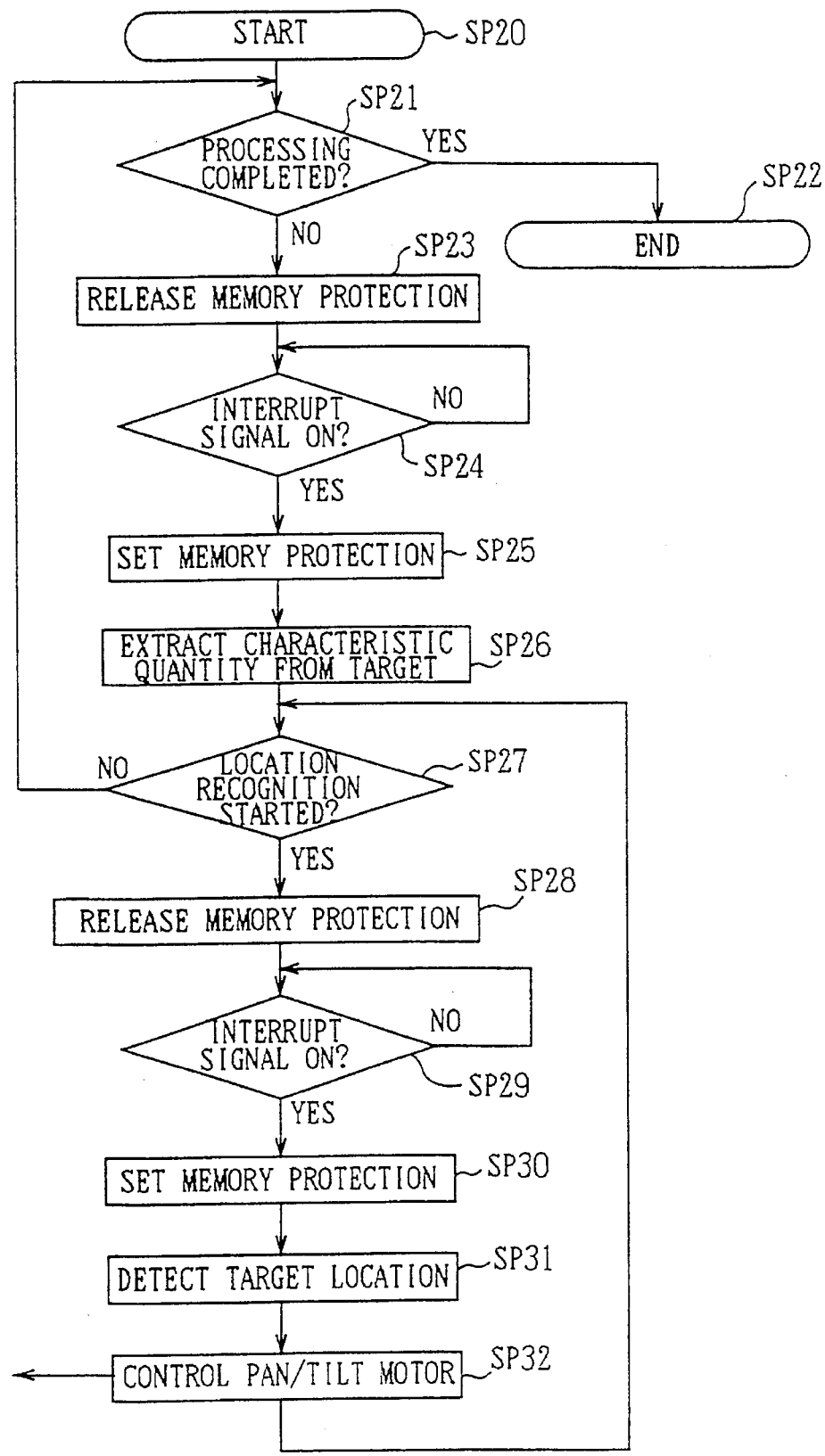
FIG. 2 is a flowchart showing a target tracking procedure executed by the microcomputer shown in FIG. 1.

FIG. 1 shows a target tracking system and, hereinafter, luminance is shown as Y, color-difference R-Y as R, and color-difference B-Y as B. In an image in memory having memory value R mentioned below, pixel values of luminance Y, and color-differences R-Y and B-Y, the pixel location being i-th vertically and j-th horizontally, are shown as $Y_{ij}$, $R_{ij}$, and $B_{ij}$. In detail, a color image signal TV1 taken by a television camera 10 is input to the filter and transformer block 11 and, after the color image signal is filtered by a low-pass filter, one sixteenth decimation horizontally and one eighth decimation vertically are performed, and the resulting luminance Y and color differences R and B are stored independently in image memory 12.

When an image composed of luminance Y, and color differences R and B is stored, interrupt signal INT is output from a memory control block 13 to a microcomputer 14. When the microcomputer 14 receives interrupt signal INT, it determines that image data in image memory 12 can be accessed, outputs write protection signal PRT for image memory 12 to the memory control block 13, and, hence, protects image data. Moreover, when a switch 16 of a pan and tilt 15 is pressed, the microcomputer sets an object in the center of the screen as the target to be tracked and extracts the characteristic quantity.

After completing this setting, the microcomputer 14 outputs a signal to release the write protection signal PRT to the image memory 12 for the memory control block 13, and, hence, new image data is stored in the image memory 12. When the new image data is stored, the interrupt signal INT is output to the microcomputer 14 again, and the microcomputer detects the characteristic quantity set as mentioned above and the location of the target from the image in the image memory 12, outputs this detection result for the pan and tilt 15 motor, and, hence, moves the television camera 10. After that, updating of the image data in the image memory 12, location detection at the microcomputer 14, and control of the television camera 10 are repeated until the switch 16 is pressed again.

The target tracking procedure SP20 is actually executed in the microcomputer 14. Namely, in this flowchart, steps SP20 is the start of all processing in the microcomputer 14, steps SP21 is decision-making determining whether all processing has terminated, and, when processing has terminated, processing proceeds to steps SP22, and target tracking procedure SP20 terminates.

Moreover, steps SP23 and SP28 release memory protection, steps SP24 and SP29 detect the interrupt signal INT, and steps SP25 and SP30 set memory protection. Furthermore, step SP26 extracts the characteristic quantity, step SP27 determines the start of location recognition, step SP31 detects the target location, and step SP32 controls the motor for the pan and tilt 15 in accordance with detected location information.

Characteristic quantity extraction from a target at the step SP26 is described first. For instance, the target means the object positioned in the center of a screen. First, region D0 (for example, a 4×4 block) centered at the screen center is set as the target. In the region D0, the set luminance $Y_{ij}$ and color differences $R_{ij}$ and $B_{ij}$ are determined by the following equation:

$$L_{ij}=|R_{ij}|+|B_{ij}| \tag{1}$$

and, through the following approximate equation:

$$Y=a1 \times L \tag{2}$$

coefficient a1 is obtained. Using mean values $Y_{AV}$ and $L_{AV}$ for the set $Y_{ij}$ and $L_{ij}$ through the following equation:

$$Y_{AV}=a1 \times L_{AV}+b1 \tag{3}$$

coefficient b1 is calculated, and the following equation:

$$Y=a1 \times L+b1 \tag{4}$$

is determined as forecast equation Y. The relation of characteristic quantity (Y, L) of the target is calculated against illumination change by regarding data around this function as data for the same object. Hence, the following equation:

$$L_{org}=L_{AV}$$

$$Y_{org}=Y_{AV} \tag{5}$$

is used to extract the characteristic quantity.

When $L_{org}$, above, establishes the following equation:

$$L_{org}<C\_TH \tag{6}$$

the target is regarded as black and white, and coefficients a1 and b1, above, are forcibly changed to the following equation:

$$a1=0.0$$

$$b1=Y_{AV} \tag{7}$$

This change is necessary, because, in black and white, Y changes in parallel with L, unlike other colors.

Figure 3A:
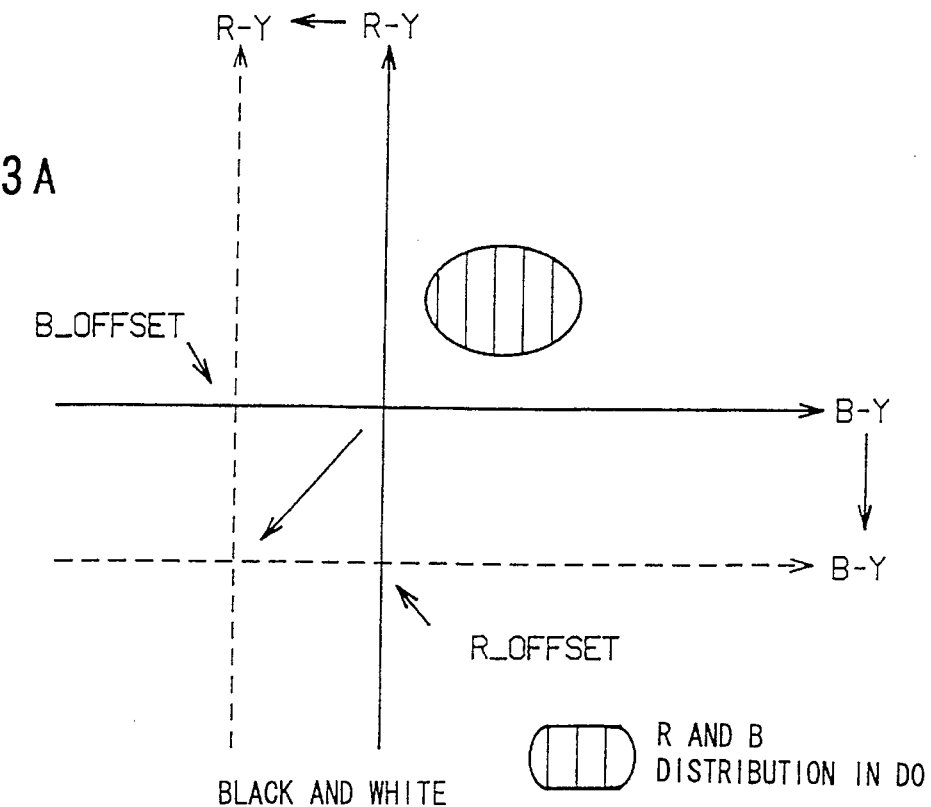
FIGS. 3A and 3B are schematic diagrams explaining origin change in a black and white image and an image other than black and white.
Figure 3B:
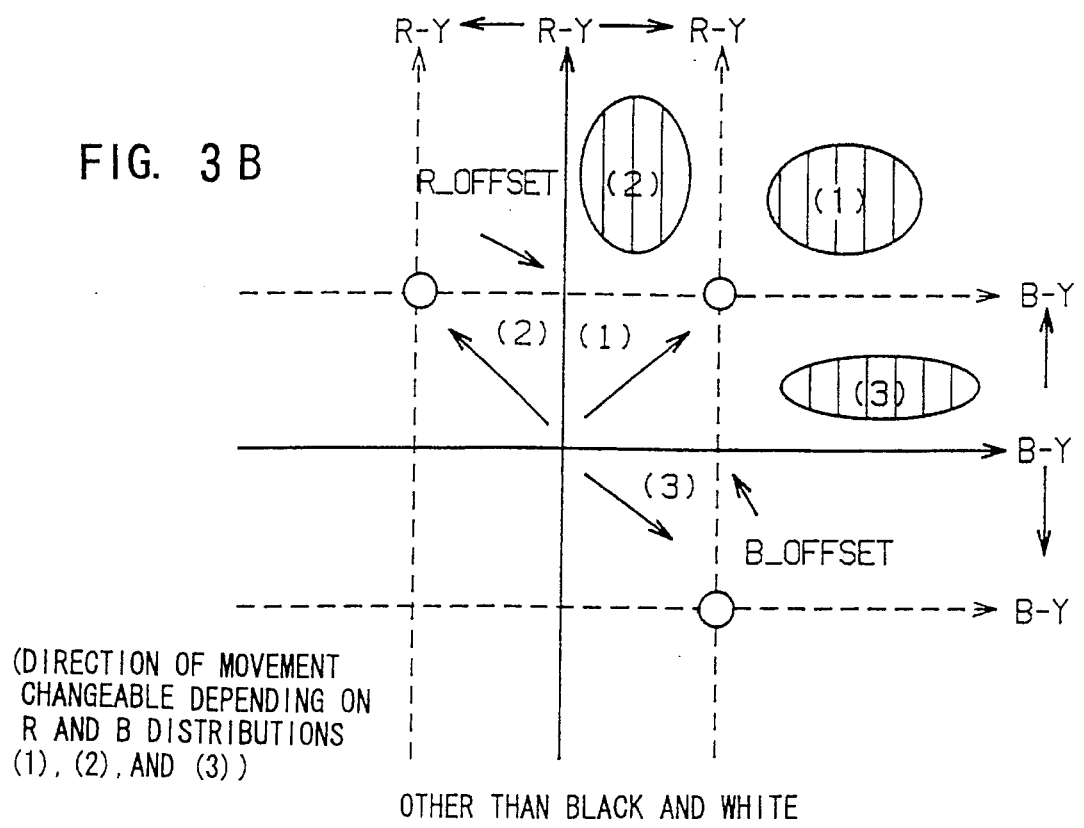

Moreover, mean values R and B in the region D0 and offsets R_OFFSET and B_OFFSET are used to change the origin of R and B as in FIGS. 3A and 3B. FIG. 3A shows the case for black and white. In this case, because R and B change over the origin due to the originally small values of R and B, R and B are evaluated using offsets. FIG. 3B shows the case for other than black and white. This has the effect that, if $R_{AV}$ and $B_{AV}$ are found, for example, in the first quadrant, R and B having very small values are not recognized as a candidate. Furthermore, in the case of the first quadrant, PS is set as PS=1, and, hence, data in the other quadrants are not processed in calculating the characteristic quantity.

In the region D0, a set $(R_{ij}+R\_OFFSET, B_{ij}+B\_OFFSET)$ is obtained through the following approximate equation:

$$(B+B\_OFFSET)=a0 \times (R+R\_OFFSET) \tag{8}$$

Coefficient a0 is obtained. Using mean values $R_{AV}$ and $B_{AV}$ for the set $(R_{ij}+R\_OFFSET, B_{ij+B}\_OFFSET)$ through the following equation $$B_{AV}=a0 \times R_{AV}+b0 \tag{9}$$

Coefficient b0 is calculated, and the following equation $$(B+B\_OFFSET)=a0 \times (R+R\_OFFSET)+b0 \tag{10}$$

is determined as forecast B. The relation of characteristic quantity (B, R) of the target is calculated against the B and R change due to illumination change by regarding data around this function as data for the same object. The invention tracks the target, regarding a0, b0, a1, b1, PS, $Y_{org}$, $L_{org}$, R_OFFSET, and B_OFFSET as characteristic quantities of the target.

Figure 4A:
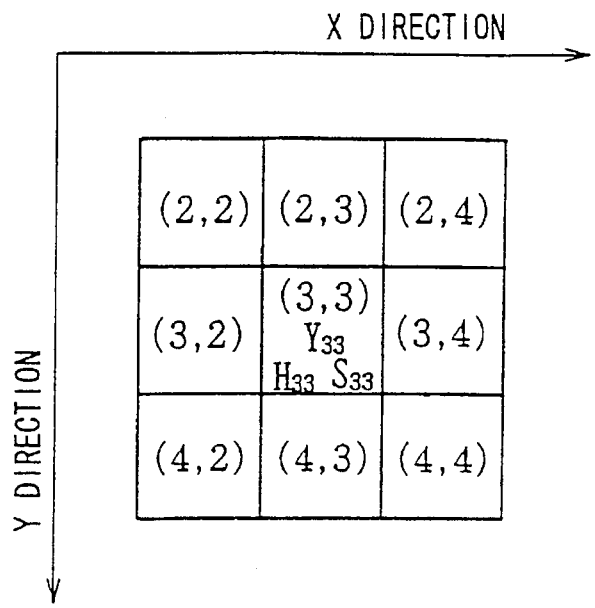
FIGS. 4A and 4B are schematic diagrams explaining transformation from a two-dimensional image to a one-dimensional evaluation function.

The actions in which characteristic quantities in the image are extracted and the target location is detected at step SP31 are described below, starting with the extraction of the characteristic quantity referring to FIGS. 4A and 4B. As an example, how the extraction of the characteristic quantity $E_{33}$ from image information $(Y_{33}, R_{33}, B_{33})$ in the location (3, 3) on the screen is described. First, $PS_{33}$ is obtained from $R_{33}-R\_OFFSET$ and $B_{33}-B\_OFFSET$. If $PS=PS_{33}$ is not established, $E_{33}=E_{MAX}$ is set.

When the above equation is established, the following equation $$Y=a1 \times L_{33}+b1 \tag{11}$$

is used for the forecast. Error $eY_{33}$ between forecast value Y and $Y_{33}$ is calculated with the following equation:

$$eY_{33}=|Y-Y_{33}| \tag{12}$$

Next, the following equation:

$$B=a1 \times (R_{33}+R\_OFFSET)+b1 \tag{13}$$

is used for the forecast. Error $eB_{33}$ between forecast value B and $B_{33}+B\_OFFSET$ is calculated with the following equation:

$$eB_{33}=|B-(B_{33}+B\_OFFSET)| \tag{14}$$

Moreover, from $Y_{org}$ and $L_{org}$, above, and $Y_{33}$ and $L_{33}$, the following equation $$ey_{33}=|Y_{org}-Y_{33}|$$

$$el_{33}=|L_{org}-L_{33}| \qquad (15)$$

is calculated. Multiplying the suitable weight of k0, k1, k2 and k3 for the above errors through the following equation $$E_{33}=k0\times(eY_{33})+k1\times(eL_{33})+k2\times(ey_{33})+k3\times(eB_{33}) \qquad (16)$$

the evaluation value of the screen location (3, 3) is calculated. However, if $E_{33} > E_{max}$ is established, then $E_{33} = E_{max}$ is set. These operations are performed each picture element (FIGS. 4A and 4B). As a result, the more similar a pixel is to the set characteristic quantity, the nearer the value of $E_{ij}$ to zero.

Figure 4B:
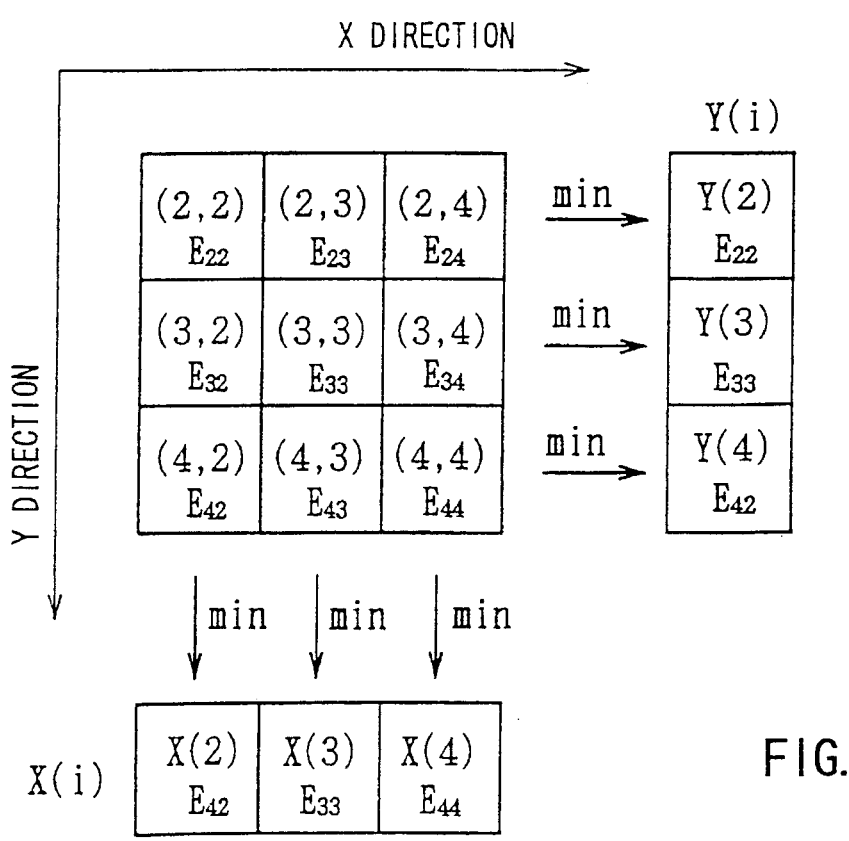
Figure 5A:
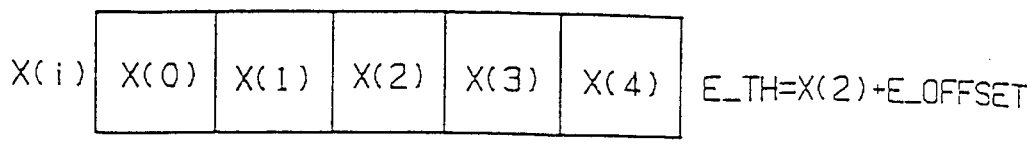
FIGS. 5A to 5C are schematic diagrams explaining the calculation of X coordinate values from X(i)

In actuality, however, the amount of calculation is too large to calculate the location from data in FIG. 4B, and is not suitable to microcomputer processing. Two-dimensional data in FIG. 4B is then transformed to one-dimensional data. The method generates one-dimensional data X(i) and Y(i) as the representative minimum values in rows and columns. Calculating minimum value min in one-dimensional data columns, the following equation $$E\_TH = \min X(i) \qquad (17)$$

is used to determine a threshold value, and data is converted to binary as shown in FIG. 5A. Switching the threshold flexibly has the effect that the evaluation value in the time when the target is diminished keeps this system from missing the target becoming large. In addition, if the time-dependent variance of calculated minimum value min becomes large, tracking pauses because the target is regarded as hidden or gone.

Figure 5B:
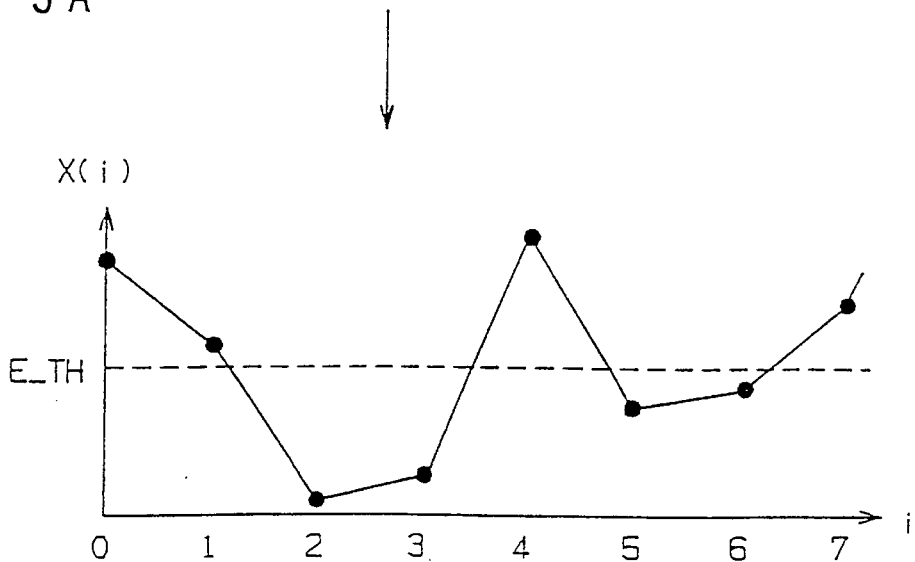
Figure 5C:
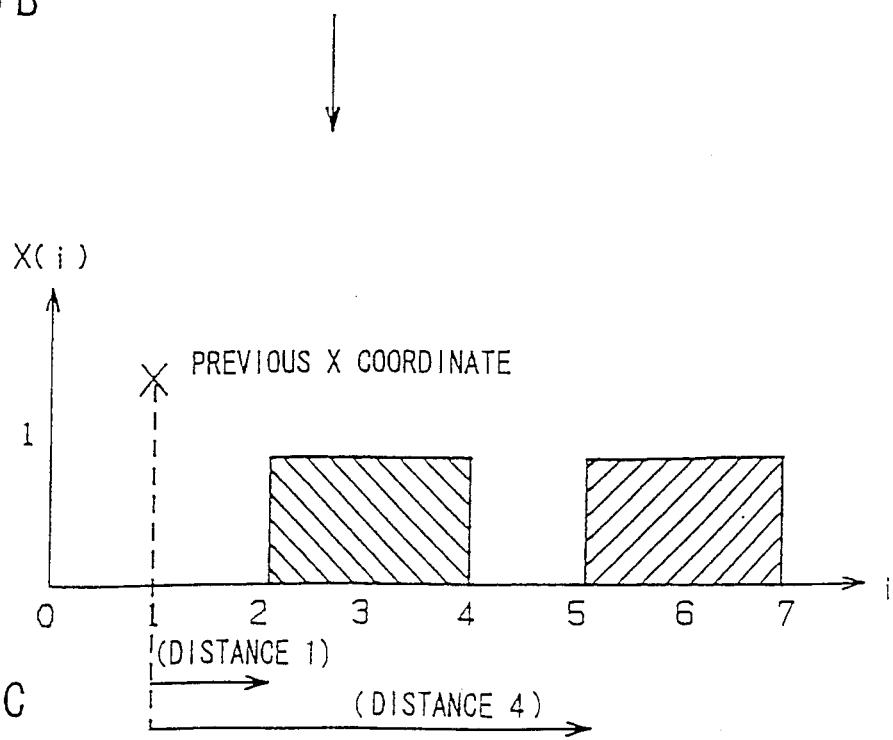

Determining a partition, where "1" continues in data converted to binary, as mentioned above, as a region, this embodiment calculates a plurality of regions as shown in FIG. 5B, and detects the location from the plurality of regions. At first, this embodiment detects the region nearest to the previously calculated location. This embodiment calculates the center of gravity of subsequent calculated regions, and sets the point as the current location. With this method, this embodiment calculates location (x, y) from data X(i) and Y(i), tracks the target by controlling the pan and tilt motor 15.

In addition, if values forecast from previous location data, for example, previous locations show as Xt−n ... Xt−1, this embodiment calculates the current point (forecast value) after generating a second-order curve with these points. It is possible to determine the location after detecting the region whose distance from the forecast value among regions in binary-converted data as mentioned above is minimum. This has the effect that, if similar objects cross, and if the movement is simple, misjudgment can be prevented.

Furthermore, although this embodiment can identify the region considered the target with the above-mentioned method among regions formed from the binary-converted data as mentioned above, without obtaining the location soon after that, it is also possible to calculate the location as mentioned above after obtaining the evaluation value again among regions formed by X(i) and Y(i). This has the effect that, if one-dimensional data is contradictory, as shown in FIGS. 6A and 6B, it is possible to detect the accurate location.

Because the two-dimensional region surrounded by the region determined with above-mentioned X(i) and Y(i) includes the target, this embodiment detects the area of the region, and can check misjudgment through the size change. In addition, based on the size change, this embodiment can drive a zoom motor and can move a focus lens and iris through image information in the region.

According to the above-mentioned structure, this invention comprises an error evaluation means by forecasting B-Y from R-Y without using hue for its determination, an origin change means of R-Y and B-Y, and a forcible coefficient change means in the case of determining a target object as black and white, whereby the invention can provide a target tracking system that can also track a black and white target with certainty, because the invention can process color change by illumination through color judgment from B-Y and R-Y with forecast coefficients, not hue, and forcibly switch the forecast coefficient of the luminance signal.

Moreover, according to the above-mentioned structure, this embodiment is superior in characteristic quantity extraction because of using information Y, R-Y, and B-Y, and, additionally, provides the characteristic quantity extraction strong in illumination change, absorbing characteristic quantity change based on illumination change through the introduction of forecast functions, and can attain the characteristic quantity extraction of a target having an unstable color such as black and white by switching forecast coefficients. Moreover, because this embodiment prevents misjudgment in the case of crossing with an object similar to the target through movement forecast of the object and can cope with contradiction in the location in the case of an object similar to the target object by repeating location calculation, stable tracking is possible.

Furthermore, according to the above-mentioned structure, because this embodiment calculates a region in location determination, this embodiment can obtain the region, including the target, using only the result, and can provide coarse region separation. In addition, because the amount of calculation is small, this embodiment can provide real-time processing with a microcomputer 14 without a specific calculation circuit, and furthermore, because there is no transformation of hue and saturation, this embodiment can simplify the structure.

In addition, the present invention is not limited to the above-mentioned embodiment, because the effects similar to one of the above-mentioned embodiment can be produced when various functions are introduced to the location, Y and B forecast functions, and when the location is calculated by obtaining the center of gravity in handling evaluation values with the above-mentioned method as two-dimensional data.

Moreover, although the above-mentioned embodiment tracks the target based on an image signal input from a television camera, it is also possible to track the target set in the image signal of interest which is played back with a video tape recorder, computer, and game machine.

Furthermore, although the invention is applied to an automated target tracking system, the invention is not only limited to this, because it is applicable to a system tracking an object with a television camera, such as a fully automated security system, TV conference system, multi media system, etc., a system locking to the object itself instead of the object location in an image such as autofocus, autoiris, and auto-zoom units, and a television camera correction manual vibration, and, additionally, if location data for the target is output, location can be input from an image using a computer, game machine, etc.

(2) Second Embodiment

Figure 7:
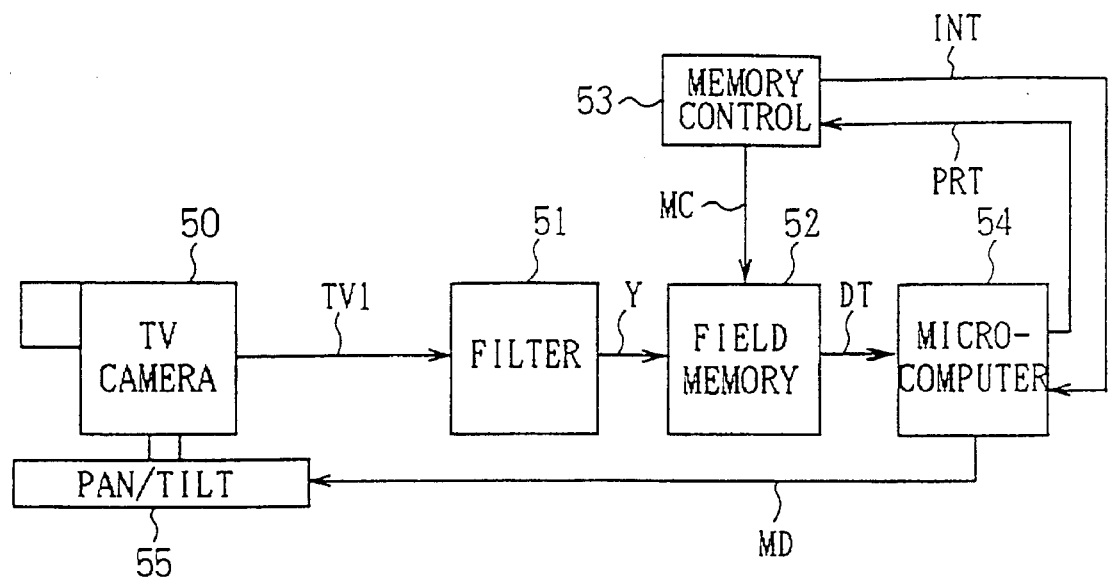
FIG. 7 is a block diagram showing a second embodiment of a target tracking system according to this invention.

FIG. 7 generally shows a target tracking system in which image signal TV1 imaged by a television camera 50 is digitalized at a filter 51, decimated at a low-pass filter after bandwidth limitation, and stored in a field memory 52. When the predetermined image is stored in the field memory 52, a memory control block 53 outputs interrupt signal INT to a microcomputer 54. When the interrupt signal INT is detected, the microcomputer 54 outputs write-protect signal PRT for protecting the writing to the field memory 12 to the memory control block 53, in order to protect data in the field memory 52.

When the write-protect signal PRT is received, the memory control block 53 protects the writing to the field memory 52. The microcomputer 54 reads image DT stored in the field memory 52 after outputting the memory write-protect signal PRT, and processes from the image stored in the microcomputer 54 and the image DT in the field memory 52 to control the pan and tilt motor.

The microcomputer 54 stores the image DT of the field memory 52 into the memory of the microcomputer 54 after generating motor control signal MD, and releases write-protect signal PRT to the memory control block 53. When the write-protect signal PRT is released, the memory control block 13 re-starts recording of the predetermined image data into the field memory 52, thereafter the television camera 50 is controlled similar to this.

Figure 8:
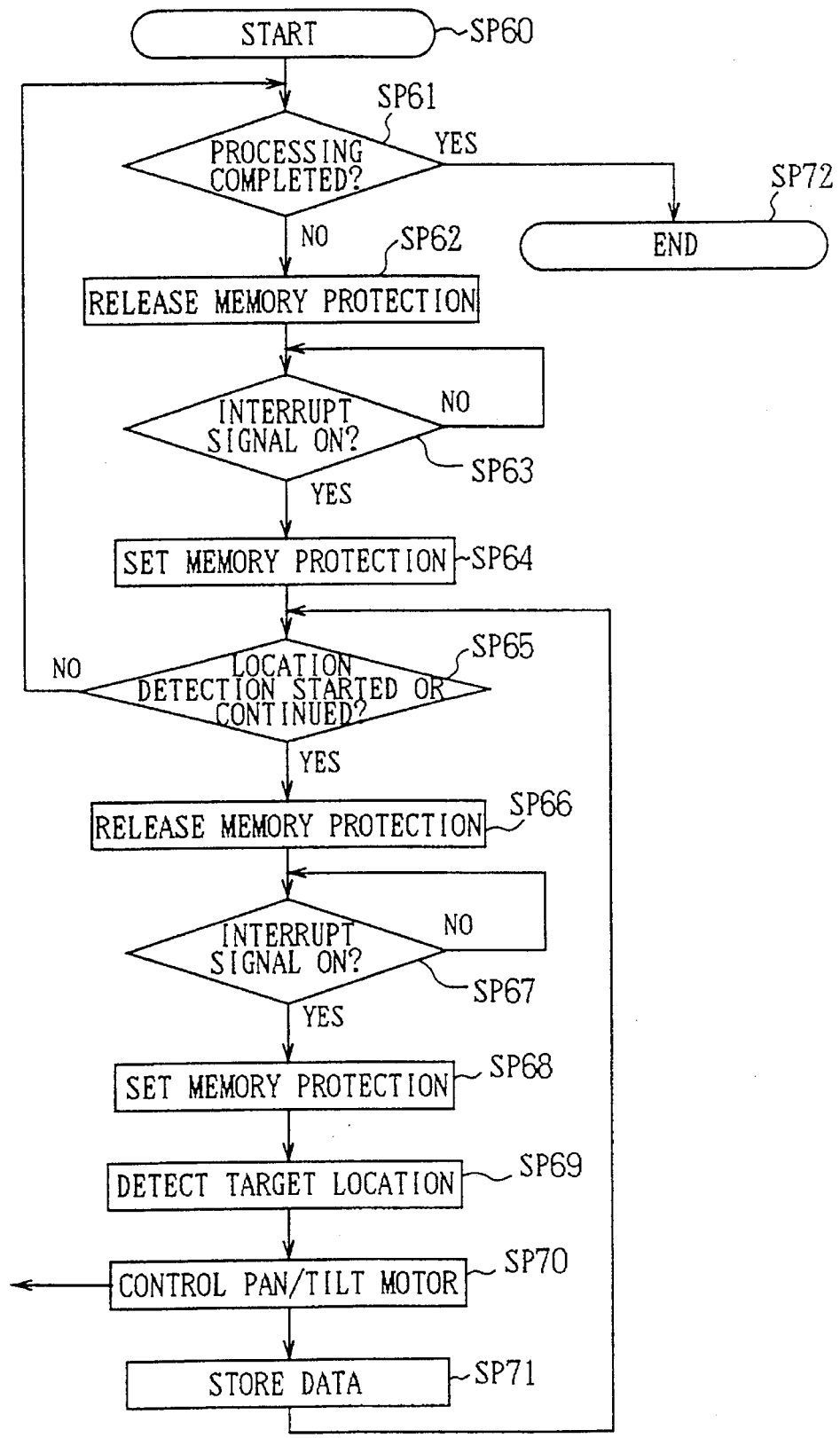
FIG. 8 is a flowchart showing a target tracking procedure executed by the microcomputer shown in FIG. 7.

Here, the target tracking procedure SP60 as shown in FIG. 8 is actually executed in the microcomputer 54. More specifically, in this flowchart, step SP60 is the start of all processing in the microcomputer 54, step SP61 is the judgment whether all processing is terminated, and if the processing is terminated, the processing proceeds to step SP72 and terminates target tracking procedure SP60.

Moreover, steps SP62 and SP66 releases memory protection, steps SP63 and SP67 detect interrupt signal, and steps SP64 and SP68 set memory protection. Furthermore, step SP65 judges whether the position detection is started or continued, step SP69 detects the position, and step SP71 stores data of the field memory 52 having the above construction in the memory of the microcomputer 54.

The function of position detecting processing in step SP69 will be described below. At first, the alteration amount between the image Ft bandwidth limited at the filter 51 and then stored in the first memory 52 and the former image Ft−1 stored in the microcomputer 54 is calculated. The alteration amount is the absolute value $e_{ij}$ of the value standardized by QSTEP set previously, which is the difference between respective pixels corresponding to the image Ft and the image Ft−1.

The alteration amount calculated by such method is integrated to obtain the data X(i) in horizontal direction and the data Y(i) in vertical direction by the equations:

$$X(i) = \sum_{k=0}^{N-1} e_{ki} \qquad (18)$$

$$Y(i) = \sum_{k=0}^{N-1} e_{ik}$$

Next, the center of gravity $C_x$, $C_y$ are calculated from X(i), Y(i) by the equations:

$$C_x = \sum_{k=0}^{N-1} k * X(i) / \sum_{k=0}^{N-1} X(k) \qquad (19)$$

$$C_y = \sum_{k=0}^{N-1} k * Y(i) / \sum_{k=0}^{N-1} Y(k)$$

The pan and tilt motor 15 is driven to control the moving object so as to position at the center of screen, in accordance with the difference between $C_x$, $C_y$ calculated in this way and the position from the center of screen. Thus, an object can be tracked.

With the above construction, the inputted image signal TV1 is filter processed to be decimated, so that noise of the image is removed and alteration amount which is difficult to have an effect from noise can be obtained. The alteration amount is integrated in horizontal direction and vertical direction to be evaluated, so that the evaluation can be performed without the effect from small object in the image. The center of gravity of the alteration amount is evaluated, so that the position can be detected even when the television camera 10 is moving. Therefore, the target tracking system which can improve the tracking efficiency of target object can be realized.

(3) Third Embodiment

Figure 9:
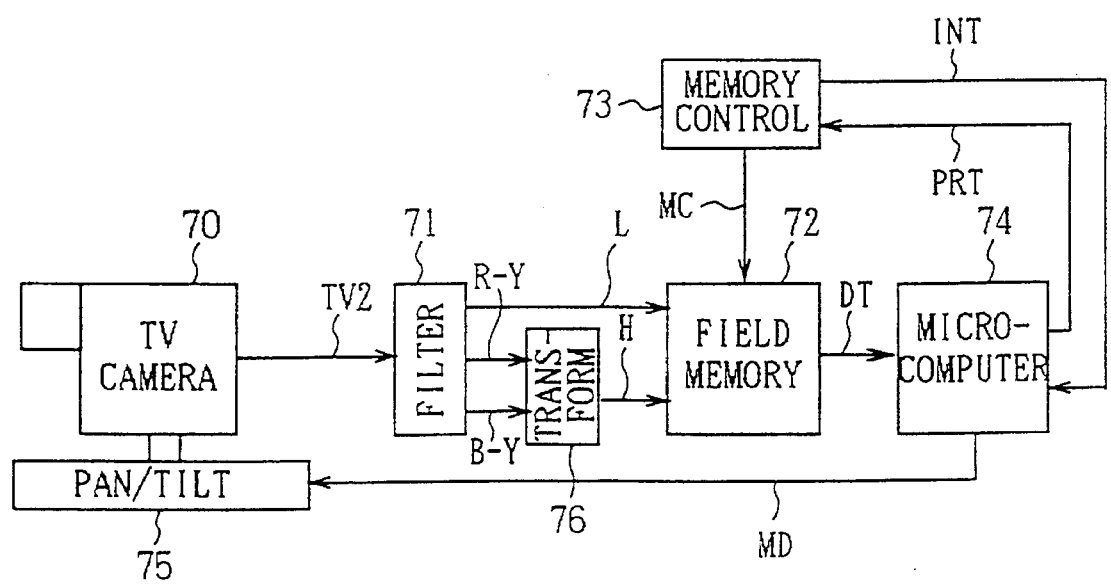
FIG. 9 is a block diagram showing a third embodiment of a target tracking system according to this invention.

FIG. 9 generally shows a target tracking system, and will be described hereinafter as input luminance signal is "L", hue signal is "H", luminance signal L and hue signal H of i-th signal in horizontal direction and j-th signal in vertical direction are "$L_{ij}$" and "$H_{ij}$" respectively. That is the luminance and color difference signal in the chrominance signal TV2 which is imaged by the a television camera 70 are digitalized at a filter 71, bandwidth limited at a low-pass filter, and then decimated. The chrominance signal R-Y, B-Y is converted into the hue signal H at a converting block 76, and the luminance signal L and the hue signal H are stored independently in a field memory 72.

When the predetermined image is recorded in the field memory 72, a memory control block 73 outputs interrupt signal INT to the microcomputer 74. When the interrupt signal INT is detected, the microcomputer 74 outputs write-protect signal PRT for protecting the write into the field memory 72 to the memory control block 73, in order to protect the data of the field memory 72. When the write-protect signal PRT is received, the memory control block 73 protects the writing into the field memory 72.

The microcomputer 74 outputs the memory write-protect signal PRT, reads the image DT stored in the field memory 72, and processes from the image stored in the microcomputer 74 and the image of the field memory 72 to control the pan and tilt motor 35. The microcomputer 74 stores the image DT of the field memory 72 in the memory of the microcomputer 74 after generating motor control signal MD, and then releases the write-protect signal PRT into the memory control block 73. When the write-protect signal PRT is released, the memory control block 73 re-starts the recording of the predetermined image data in the field memory 72, thereafter the television camera 70 is controlled similar to this.

Figure 10:
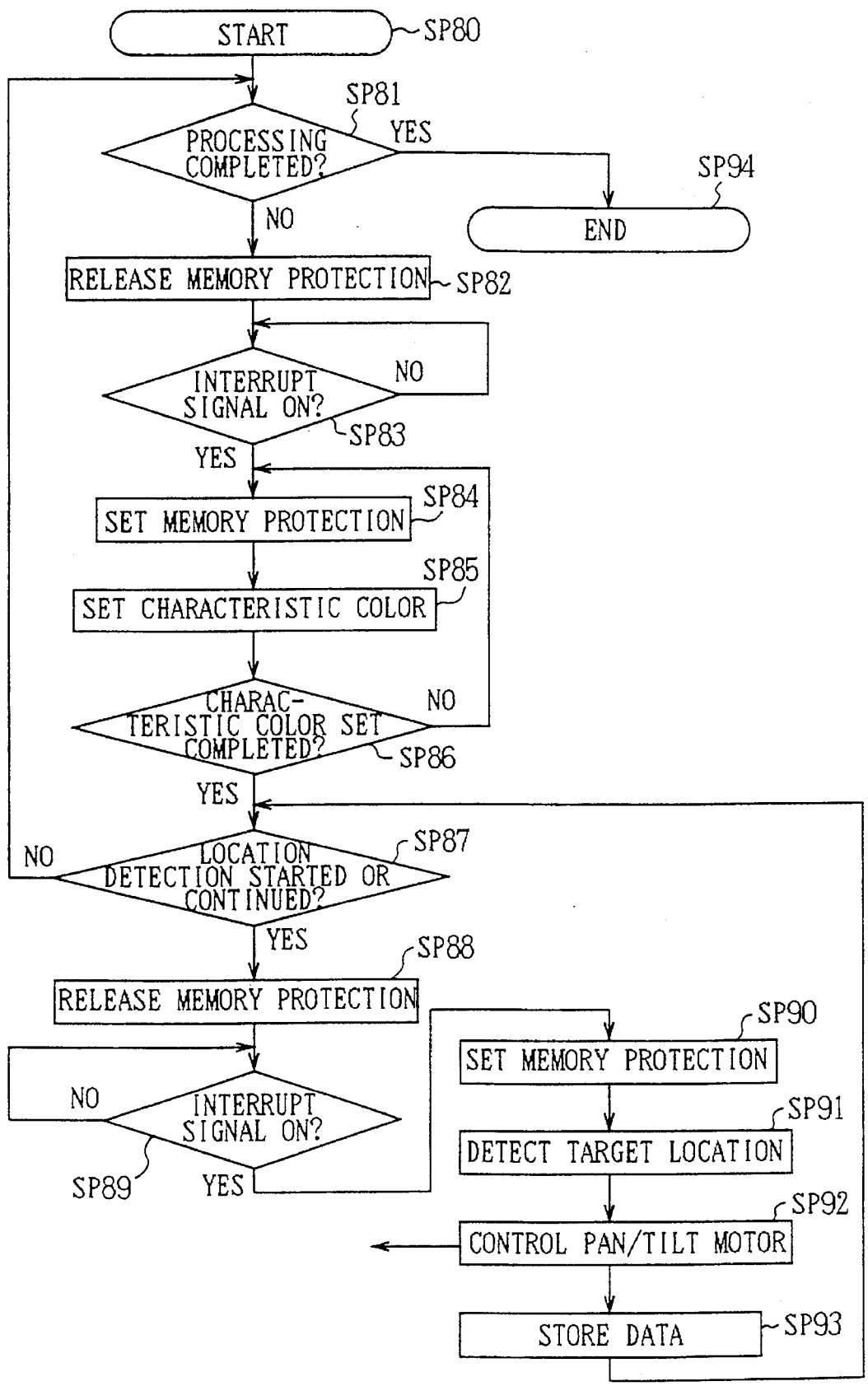
FIG. 10 is a flowchart showing a target tracking procedure executed by the microcomputer shown in FIG. 9.

Here, the target tracking procedure SP80 as shown in FIG. 10 is actually executed in the microcomputer 74. More specifically, in this flowchart, step SP80 is the start of all processing in the microcomputer 74, step SP81 is the judgment whether all processing is terminated, and if the processing is terminated, the processing proceeds to step SP94 and terminates target tracking procedure SP80.

Moreover, steps SP82 and SP88 releases memory protection, steps SP83 and SP89 detect interrupt signal, and steps SP84 and SP90 set memory protection. Furthermore, step SP85 sets the characteristic color, step SP86 judges whether the set of the characteristic color is terminated, step SP87 judges whether the position detection is started or continued, step SP91 detects the position, and step SP93 stores data of the field memory 72 having the above construction in the memory of the microcomputer 74.

The function of characteristic color setting processing in step SP85 will be described below. The target object is positioned at the center of the screen, histogram of the luminance signal H with the area of which the center of screen is the center (e.g., the area having the size of 3×3), and the luminance signal H in which histogram becomes the maximum is selected as "$H_{org}$". Next, the function of position detecting processing in step SP91 will be described below. The alteration amount between the image Ft of the luminance signal L bandwidth limited at the filter 81 to be decimated, and then stored in the field memory 72, and the former image Ft−1 of the luminance signal L stored in the microcomputer 74 is calculated. The alteration amount is the absolute value $f_{ij}$ of the value standardized by QSTEP set previously, which is the difference between respective pixels corresponding to the image Ft and the image Ft−1.

Also, the absolute value $g_{ij}$ of the difference between the luminance signals $H_{ij}$ and $H_{org}$ is detected and the weight $w_{ij}$ is determined based on the size of the value $g_{ij}$. The weight $w_{ij}$ is previously set, for example, in such manner that $w_{ij}=1.0$ when the absolute value $g_{ij}$ is "0" and the absolute value $g_{ij}$ becomes larger, the more the weight $w_{ij}$ becomes close to "0.0". The alteration amount is defined as $e_{ij}=w_{ij} \times f_{ij}$ from $f_{ij}$ and $w_{ij}$. The alteration amount calculated by such a method is integrated to obtain the data X(i) in horizontal direction and the data Y(i) in vertical direction by the equations:

$$X(i) = \sum_{k=0}^{N-1} e_{ki} \qquad (20)$$

$$Y(i) = \sum_{k=0}^{N-1} e_{ik}$$

Next, the center of gravity $C_x$, $C_y$ are calculated from X(i), Y(i) by the equations:

$$C_x = \sum_{k=0}^{N-1} k * X(i) / \sum_{k=0}^{N-1} X(k) \qquad (21)$$

$$C_y = \sum_{k=0}^{N-1} k * Y(i) / \sum_{k=0}^{N-1} Y(k)$$

The pan and tilt motor 55 is driven to control the moving object so as to position at the center of screen, in accordance with the difference between $C_x$, $C_y$ calculated in this way and the position from the center of screen. Thus, an object can be tracked.

With the above construction, the inputted image signal TV2 is filter processed to be decimated, so that noise of the image is removed and alteration amount which is difficult to have an effect from noise can be obtained. The alteration amount for the specified characteristic color is weighted, so that the alteration amount of target object can be regarded important. The alteration amount is integrated in horizontal direction and vertical direction to be evaluated, so that the evaluation can be performed without the effect from small object in the image. The center of gravity of the alteration amount is evaluated, so that the position can be detected even when the television camera 50 is moving. Therefore, the target tracking system which can significantly improve the tracking efficiency of target object can be realized.

(4) Other Embodiment

In the embodiments discussed above, the position is detected by using the center of gravity in horizontal and vertical direction which is the difference between fields of image. However, this invention is not only limited to this, but instead of the center of gravity, n-dimensional moment may be used, and a plurality of characteristic colors may be set and each set color may be weighted. In short, in the method for extracting the characteristic color from the image, various methods can be used, not being limited to the above embodiments.

Further, in the embodiments discussed above, the system for automatically tracking a target is applied. However, this invention is not only limited to this, but is widely applicable to the case of the automation of security system or the case of the automation of camera work such as pan/tilt in the television conference system and the camcoder, which are performed from the screen.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

Note that, with reference to this invention, the other application (European Patent Publication No.0578508, published on Jan. 12, 1994) has been applied by Sony Corporation being applicant of this invention, further, of which the corresponding application has been filed to the U.S. Patent Office.

What is claimed is:

1. A target tracking system comprising:
   memory means for storing R-Y signals, B-Y signals and luminance signals of an input color image in a first region of interest, wherein said image is subdivided into a plurality of pixels and an individual set of R-Y signal, B-Y signal, and luminance signal is associated with a pixel of said image;
   a processor programmed to extract predetermined characteristic quantities of said image from said first region of interest, said programmed processor being operable to: (a) calculate a forecasted luminance signal as a function of luminance forecast coefficients which are determined as a function of (i) said R-Y signals and (ii) said B-Y signals of said image in said region of interest, (b) calculate a forecasted B-Y signal as a function of B-Y forecast coefficients which are determined as a function of said B-Y signal of said image in said region of interest, (c) calculate a one-dimensional evaluation function from an absolute sum of (i) luminance signal differences which are determined as a function of luminance signals associated with respective pixels in said image, (ii) set color differences which are determined as a function of sets of R-Y and B-Y signals associated with respective pixels in said image, (iii) luminance forecast errors which are determined as a function of the luminance signal associated with a pixel of said image and said forecasted luminance signal, and (iv) B-Y forecast errors which are determined as a function of said B-Y signal associated with the pixel of said image and said forecasted B-Y signal, (d) change an origin of said R-Y signals and said B-Y signals in response to a user input, (e) convert the image to a binary image by adaptively changing a threshold value of said one-dimensional evaluation function, and (f) determine a location of a target object from said binary image;
   camera control means for controlling panning and tilt of a television camera based on said location of said target object to provide a second region of interest;
   said processor being further programmed to continuously track said target object in said second region of interest until a switch is operated by an operator to disable the camera control means, whereby said processor is operable to extract said predetermined characteristic quantities of said image from said second region of interest and to control the camera control means to effect the panning and tilt of the television camera based on said location of said target object.

2. The target tracking system according to claim 1 wherein, said camera control means assigns a specific region in said image and controls the focus and iris of a television camera.

3. The target tracking system according to claim 1, wherein said processor is operable to forecast said location of a subsequent target object from said location of a previous target object obtained from the processor.

4. The target tracking system according to claim 1, wherein said processor is operable to detect the size of said target object in said image from said location of said target object determined by the processor.

5. The target tracking system according to claim 4, wherein said camera control means controls a zoom motor of said television camera based on the size of said target object detected by said processor.

6. The target tracking system according to claim 4, wherein said processor is operable to determine the region of said target object and to solve a contradiction of said location by repeating said extraction of said predetermined characteristic quantities.

* * * * *